United States Patent
Yang et al.

(10) Patent No.: US 9,451,429 B2
(45) Date of Patent: Sep. 20, 2016

(54) MESSAGE PROCESSING METHOD WITH RESPECT TO TERMINAL HAVING MULTIPLE EXTERNAL IDENTIFIERS

(71) Applicant: ZTE Corporation, Shenzhen, Guangdong (CN)

(72) Inventors: Kun Yang, Shenzhen (CN); Hao Wu, Shenzhen (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 8 days.

(21) Appl. No.: 14/420,030

(22) PCT Filed: Jul. 30, 2013

(86) PCT No.: PCT/CN2013/080423
§ 371 (c)(1),
(2) Date: Feb. 6, 2015

(87) PCT Pub. No.: WO2014/023175
PCT Pub. Date: Feb. 13, 2014

(65) Prior Publication Data
US 2015/0208214 A1 Jul. 23, 2015

(30) Foreign Application Priority Data
Aug. 10, 2012 (CN) .......................... 2012 1 0284982

(51) Int. Cl.
*H04W 4/14* (2009.01)
*H04W 8/26* (2009.01)
(Continued)

(52) U.S. Cl.
CPC .............. *H04W 4/14* (2013.01); *H04L 61/106* (2013.01); *H04W 4/005* (2013.01); *H04W 8/26* (2013.01)

(58) Field of Classification Search
CPC ....... H04W 4/14; H04W 4/005; H04W 8/26; H04L 61/106
See application file for complete search history.

(56) References Cited

U.S. PATENT DOCUMENTS

| 6,519,468 B1 | 2/2003 | Donovan | |
|---|---|---|---|
| 2013/0070710 A1 | 3/2013 | Guo | |
| 2013/0273855 A1* | 10/2013 | Cherian | H04W 4/005 455/68 |

FOREIGN PATENT DOCUMENTS

| CN | 101998310 A | 3/2011 |
|---|---|---|
| CN | 102413453 A | 4/2012 |

(Continued)

OTHER PUBLICATIONS

International Search Report in international application No. PCT/CN2013/080423, mailed on Oct. 31, 2013.
(Continued)

*Primary Examiner* — Nathan Mitchell
(74) *Attorney, Agent, or Firm* — Oppedahl Patent Law Firm LLC (57) ABSTRACT

Disclosed are a message processing method with respect to a terminal having multiple External Identifiers (EIDs) and a network side device, and the method includes: a network side device transmits an SMS message carrying a triggering message to a terminal, upon a triggering request from an MTC server, wherein the SMS message contains a TPDU, in which a TP-DA parameter is written as an LID of an EID or a triggering-specific identifier configured for the terminal; the network side device receives a triggering response from the terminal; the EID corresponding to the terminal is retrieved according to the LID or triggering-specific identifier carried in the triggering response; and the triggering request from the MTC server is responded according to the retrieved EID. The disclosure makes it possible for a network side to correctly respond to a triggering request from an MTC server while the security of the terminal is ensured.

6 Claims, 4 Drawing Sheets

(51) Int. Cl.
*H04W 4/00* (2009.01)
*H04L 29/12* (2006.01)

(56) References Cited

FOREIGN PATENT DOCUMENTS

| CN | 102447747 A | 5/2012 |
| CN | 102833705 A | 12/2012 |
| WO | 2011140975 A1 | 11/2011 |

OTHER PUBLICATIONS

English Translation of the Written Opinion of the International Search Authority in international application No. PCT/CN2013/080423, mailed on Oct. 31, 2013.
Supplementary European Search Report in European application No. 13828338.7, mailed on Jul. 7, 2015.
3GPP TR 23.888 V1.6.1, Feb. 2012.
3GPP TS 23.682 V11.0.0, Mar. 2012.

* cited by examiner

MESSAGE PROCESSING METHOD WITH RESPECT TO TERMINAL HAVING MULTIPLE EXTERNAL IDENTIFIERS

TECHNICAL FIELD

The disclosure relates to the field of Machine Type Communication (MTC), and in particular to a message processing method with respect to a terminal having multiple external identifiers, and a network side device.

BACKGROUND

Figure 1:
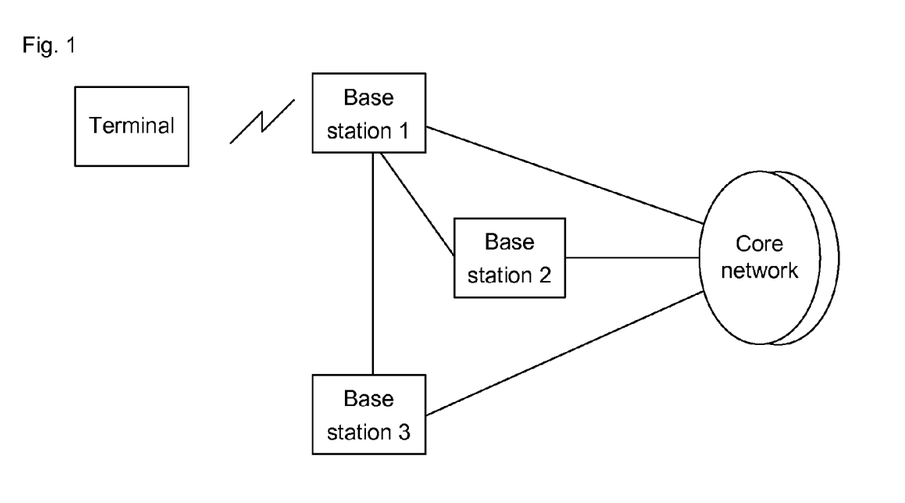
FIG. 1 is a schematic structural diagram of a cell mobile communication system according the prior art.

An existing cell mobile communication system, as shown in FIG. 1, consists mainly of a Core network (CN), a Radio Access Network (RAN) and a terminal. The CN holds responsibility for non-access stratum services such as update of terminal location and the like, and the CN is an anchor for the user plane. The RAN includes a base station or includes a station and a base station controller, and the RAN holds responsibility for access stratum services such as management of radio resources; physical or logical connections may exist, according to practical conditions, between base stations, for example connections between base station 1 and base station 2 or base station 3, as shown in FIG. 1; moreover each base station can be connected to one or more CN nodes. The terminal, i.e., User Equipment (UE), refers to various equipments that can communication with the cell mobile communication network, such as a mobile phone, a laptop computer and the like.

Specifically, the CN includes mainly the following network elements:

SMS Service Center (SMS-SC), which generates the content of an SMS message and package it as an SMS data packet according to an SMS protocol;

SMS Gateway Mobile Switching Center (SMS-GMSC), which receives an SMS data packet transmitted by the SMS-SC, reads and checks parameters in the SMS data packet, queries a Home Subscriber Server (HSS) for routing information of the terminal, which herein refers to identifiers of a Mobile Switching Center (MSC) and a Mobility Management Entity (MME) via which the SMS message is transmitted;

HSS, which stores subscription information of each subscriber, and information of a serving node, for example an identifier of a serving node (MSC or MME) that provides the terminal with services;

MSC, which is a core network entity responsible for providing, in a circuit switched network, the terminal with services including control signaling transmission, SMS message transmission and mobility management;

MME, which is a core network entity responsible for providing, in a packet switched network, the terminal with services including control signaling transmission, SMS message transmission and mobility management; and MTC Inter Working Function (MTC-IWF) entity, which is a connection entity between a mobile communication network and an external public network and can implement functions such as protocol conversion, address query and information storage.

An External Identifier (EID) of a terminal refers to an identifier used by the terminal beyond a mobile communication network, and the EID should be globally unique and include following two portions:

1. an Domain Identifier (DID), which identifies a domain controlled by a mobile network operator, the domain is use to identify an access address of a service provided by the operator's network, such as a service provided by MTC-IWF, and the operator may use different DIDs to provide different service accesses;

2. a Local Identifier (LID), which is an identifier used to acquire an International Mobile Subscriber Identity (IMSI) of a terminal and managed by a mobile network operator, and which is unique within its applied scope.

Each terminal has only one IMSI but one or more EIDs, that is to say, one IMSI of a terminal corresponds to one or more EIDs. In the prior art, after receiving a triggering request from an MTC server, a terminal is desired to respond immediately and establish a connection with the MTC server; however, for a terminal having multiple EIDs, when the terminal responds to the MTC server and requests to establish the connection with the MTC server, a network side cannot distinguish between different EIDs, thus the network side may respond erroneously to the triggering request from the MTC server, that is to say, the network side cannot use a correct EID to respond to the triggering request from the MTC server.

On the other hand, in the prior art, a destination address (TP-DA) parameter in a Transmission Protocol Data Unit (TPDU) of an SMS message is written as a Mobile Subscriber ISDN (MSISDN) number of the terminal at an SMS-SC, where the ISDN stands for Integrated Service Digital Network. Then during MSISDN-less communications, other terminal identifiers are needed to replace the MSISDN number. In existing solutions, the TP-DA parameter is directly written as an IMSI, however excessive exposure of an authentic IMSI of a terminal to an network will inevitably result in potential security hazards to the terminal.

SUMMARY

In view of the above, the embodiment of the disclosure is intended to provide a message processing method with respect to a terminal having multiple External Identifiers (EIDs) and a network side device so that the network side can correctly respond to a triggering request from an MTC server while the security of the terminal is ensured.

To this end, the technical solutions of embodiments of the disclosure are implemented as follows.

The embodiment of the disclosure provides a message processing method with respect to a terminal having multiple EIDs, which includes: a network side device transmits a Short Messaging Service (SMS) message carrying a triggering message to a terminal, upon a triggering request from a Machine Type Communication (MTC) server, wherein the SMS message contains a Transmission Protocol Data Unit (TPDU), in which a destination address (TP-DA) parameter is written as a Local Identifier (LID) of an EID or a triggering-specific identifier configured for the terminal; the network side device receives a triggering response from the terminal; the EID corresponding to the terminal is retrieved according to the LID or triggering-specific identifier carried in the triggering response; and the triggering request from the MTC server is responded according to the retrieved EID.

In an embodiment, the step that the EID corresponding to the terminal is retrieved according to the LID carried in the triggering response may include: according to an IMSI carried in the triggering response, a local database in the network side device is searched for the EIDs indexed by the IMSI; and the EID corresponding to the LID carried in the triggering response is retrieved in the searched out EIDs, In an embodiment, the method may further include: an one-to-one mapping between the triggering-specific identifier and the EID is stored when the TP-DA parameter is written as the triggering-specific identifier configured for the terminal at the network side device; accordingly, the step that the EID corresponding to the terminal is retrieved according to the triggering-specific identifier carried in the triggering response may include: according to an IMSI carried in the triggering response, a local database in the network side device is searched for the EIDs indexed by the IMSI; and the EID corresponding to the triggering-specific identifier carried in the triggering response is retrieved in the searched out EIDs, In an embodiment, the method may further include: an identifier is added to stored information at the network side device as the triggering-specific identifier, which has a format as same as that of a Mobile Subscriber ISDN (MSISDN) number of the terminal.

The embodiment of the disclosure further provides a network side device, which includes: a Short Messaging Service (SMS) message transmission module configured to transmit an SMS message carrying a triggering message to a terminal upon a triggering request from a Machine Type Communication (MTC) server, wherein the SMS message contains a Transmission Protocol Data Unit (TPDU), in which a destination address (TP-DA) parameter is written as a Local Identifier (LID) of an EID or a triggering-specific identifier configured for the terminal; and a retrieving and responding module configured to receive a triggering response from the terminal, retrieve the EID corresponding to the terminal according to the LID or triggering-specific identifier carried in the triggering response and respond to the triggering request from the MTC server according to the retrieved EID.

The retrieving and responding module may be further configured to search, according to an IMSI carried in the triggering response, a local database in the network side device for EIDs indexed by the IMSI; and retrieve, in the searched out EIDs, the EID corresponding to the triggering-specific identifier carried in the triggering response.

The SMS message transmission module may be further configured to store an one-to-one mapping between the triggering-specific identifier and the EID, when the TP-DA parameter is written as the triggering-specific identifier configured for the terminal at the network side device; and the retrieving and responding module may be further configured to search, according to an IMSI carried in the triggering response, a local database in the network side device for EIDs indexed by the IMSI, and retrieve, in the searched out EIDs, the EID corresponding to the triggering-specific identifier carried in the triggering response.

The device may further include a configuration module configured to add an identifier to stored information at the network side device as the triggering-specific identifier, which has a format as same as that of a Mobile Subscriber ISDN (MSISDN) number of the terminal.

By means of the message processing method with respect to a terminal having multiple EIDs and the network side device according to the embodiment of the disclosure, in a case of a terminal having multiple EIDs, when the terminal responds to an MTC server and requests to establish a connection with the MTC server, the network side can retrieve EIDs of the terminal and use a correct EID of the terminal to respond to a terminal triggering request from the MTC server; the TP-DA parameter is directly written as an LID or triggering-specific identifier of the terminal, this makes it possible to prevent excessive exposure of the authentic IMSI of the terminal to an network, thereby ensuring the security of the terminal.

DETAILED DESCRIPTION

Technical solutions of the disclosure will be further elaborated below in combination with accompanying drawings and specific embodiments.

Figure 2:
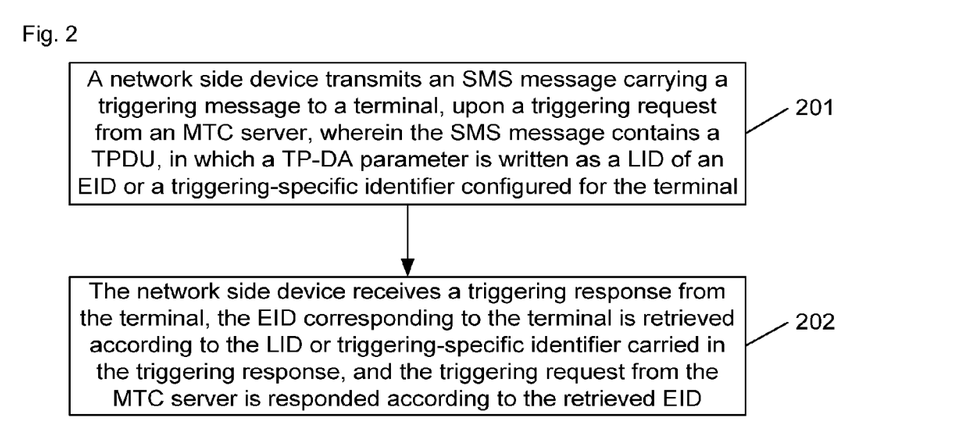
FIG. 2 is a flow chart of a message processing method with respect to a terminal having multiple EIDs according to an embodiment of the disclosure.

The embodiment of the disclosure provides a message processing method with respect to a terminal having multiple EIDs, as shown in FIG. 2, which includes:

step 201, a network side device transmits a Short Messaging Service (SMS) message carrying a triggering message to a terminal, upon a triggering request from a Machine Type Communication (MTC) server, wherein the SMS message contains a Transmission Protocol Data Unit (TPDU), in which a destination address (TP-DA) parameter is written as a Local Identifier (LID) of an EID or a triggering-specific identifier configured for the terminal; and step 202, the network side device receives a triggering response from the terminal, the EID corresponding to the terminal is retrieved according to the LID or triggering-specific identifier carried in the triggering response, and the triggering request from the MTC server is responded according to the retrieved EID.

The SMS message carrying a triggering message may further carry an IMSI of the terminal, and the triggering response may further carry the IMSI of the terminal.

In an embodiment, the step that the EID corresponding to the terminal is retrieved according to the LID carried in the triggering response includes:

according to an IMSI carried in the triggering response, a local database in the network side device is searched for the EIDs indexed by the IMSI; and the EID corresponding to the LID carried in the triggering response is retrieved in the searched out EIDs, Preferably, the method may further include: an one-to-one mapping between the triggering-specific identifier and the EID is stored when the TP-DA parameter is written as the triggering-specific identifier configured for the terminal at the network side device;

accordingly, the step that the EID corresponding to the terminal is retrieved according to the triggering-specific identifier carried in the triggering response may include:

according to an IMSI carried in the triggering response, a local database in the network side device is searched for the EIDs indexed by the IMSI; and the EID corresponding to the triggering-specific identifier carried in the triggering response is retrieved in the searched out EIDs, Preferably, the method may further include: an identifier is added to stored information at the network side device as the triggering-specific identifier, which has a format as same as that of a Mobile Subscriber ISDN (MSISDN) number of the terminal.

Network elements involved in the method according to the embodiment of the disclosure mainly include SMS-SC, SMS-GMSC, HSS, MME and MTC-IWF. The message processing method with respect to a terminal having multiple EIDs according to the embodiment of the disclosure will be elaborated below in combination with the above network elements.

Figure 3:
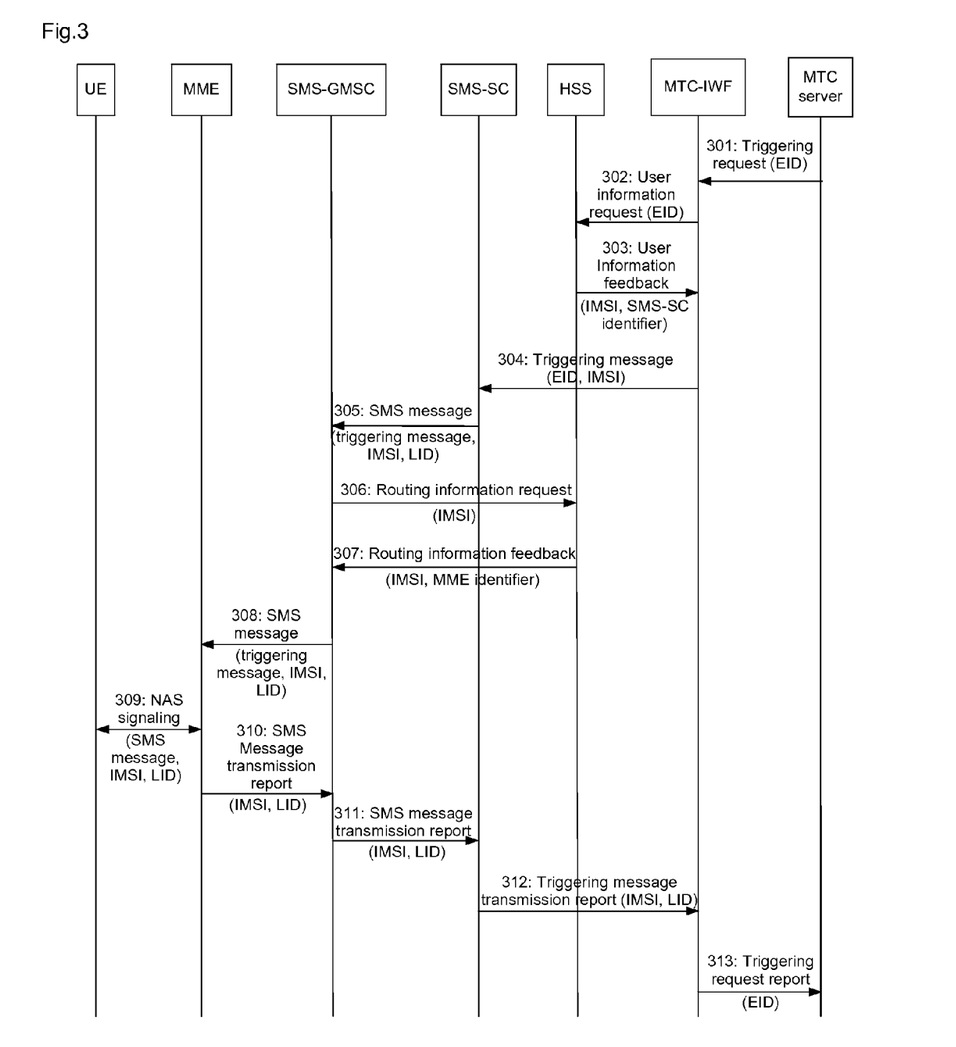
FIG. 3 is a flow chart of terminal triggering according to a first embodiment of the disclosure.

In a first embodiment of the disclosure, a TP-DA parameter in a TPDU of an SMS message is written as an LID of an EID at a network side device, a corresponding flow chart of terminal triggering is as shown in FIG. 3, which mainly includes the following steps:

step 301, when desiring to acquire real-time data from a terminal, an MTC server transmits, to an MTC-IWF, a triggering request message for the terminal, in which an identifier of the terminal, an identifier of an MTC application and an address of the MTC server are included. The identifier of the terminal is an External Identifier (EID) used by the terminal beyond a mobile communication network, which includes a DID and an LID.

Step 302, after receiving the triggering request message from the MTC server, the MTC-IWF requests an HSS for information of the terminal via a user information request message in which an EID of the terminal is included.

Step 303, after receiving the user information request message from the MTC-IWF, the HSS searches, according to the EID in the user information request message, locally-stored terminal subscription data for corresponding information of the terminal, in which an IMSI and serving CN node information of the terminal are included, and transmits the searched out information of the terminal to the MTC-IWF via a user information response message. The serving CN node information of the terminal may be an identifier of a serving SMS-SC of the terminal.

Step 304, after acquiring and storing the information of the terminal, the MTC-IWF newly establishes a triggering message and transmits, to the serving CN node of the terminal (in the embodiment namely the serving SMS-SC of the terminal), the triggering message in which the EID and IMSI of the terminal are included.

Step 305, after receiving the triggering message from the MTC-IWF, the SMS-SC reads the EID and IMSI therein, establishes an SMS message carrying the triggering message, i.e., the triggering message serving as a information element of the SMS message, and transmits, to an SMS-GMSC, the SMS message carrying the triggering message, in which the IMSI of the terminal is included.

In addition, the SMS message contains a Transmission Protocol Data Unit (TPDU), in which a destination address (TP-DA) parameter is written as a Local Identifier (LID) of the EID at the SMS-SC.

Step 306, after receiving the SMS message from the SMS-SC, the SMS-GMSC requests the HSS for routing information of the terminal via a routing information request message in which the IMSI of the terminal is included.

Step 307, after receiving the routing information request message from the SMS-GMSC, the HSS searches, according to the IMSI, a local database for an MME identifier indexed by the IMSI, then transmits to the SMS-GMSC a routing information feedback message in which the IMSI and the searched out MME identifier are included.

Step 308, after receiving the routing information feedback message, the SMS-GMSC reads the MME identifier therein, and transmits the SMS received from the SMS-SC to the MME corresponding to the MME identifier.

Step 309, the MME reads the IMSI in the SMS message, and queries, according to the IMSI, a local database for a state of the terminal; if the terminal is in an idle state, the MME transmits a paging message to the terminal which, after receiving the paging message, transmits to the MME a service request signaling requesting to establish a Non-Access Stratum (NAS) connection with the MME; after completion of the establishment of the NAS connection, the MME packages, the SMS message received from the SMS-GMSC, in an NAS signaling (downlink NAS transport signaling), i.e., the SMS message serving as an information element of the NAS signaling, and transmits the NAS signaling to the terminal. If the terminal is in a connection state, the MME directly packages the SMS message in the downlink NAS transport signaling and transmits the signaling to the terminal. After receiving the SMS message, the terminal transmits acknowledgement feedback information to the MME.

Step 310, the MME transmits, to the SMS-GMSC, an SMS message transmission report which indicates that the SMS message is successfully transmitted and which includes the IMSI and the LID written as the TP-DA parameter.

Step 311, after receiving the SMS message transmission report, the SMS-GMSC transmits, to the SMS-SC, the SMS message transmission report which indicates that the SMS message is successfully transmitted and which includes the IMSI of the terminal and the LID.

Step 312, after receiving the SMS message transmission report, the SMS-SC transmits, to the MTC-IWF, a triggering message transmission report which indicates that the triggering message is successfully transmitted and which includes the IMSI of the terminal and the LID.

Step 313, after receiving the triggering message transmission report, the MTC-IWF reads the IMSI and LID therein, searches, according to the IMSI, a local database for EIDs indexed by the IMSI, retrieves, in the searched out EIDs, the EID corresponding to the LID, and transmits, to the MTC server, a triggering request report which indicates that the triggering request is successful and which includes the EID corresponding to the LID.

Figure 4:
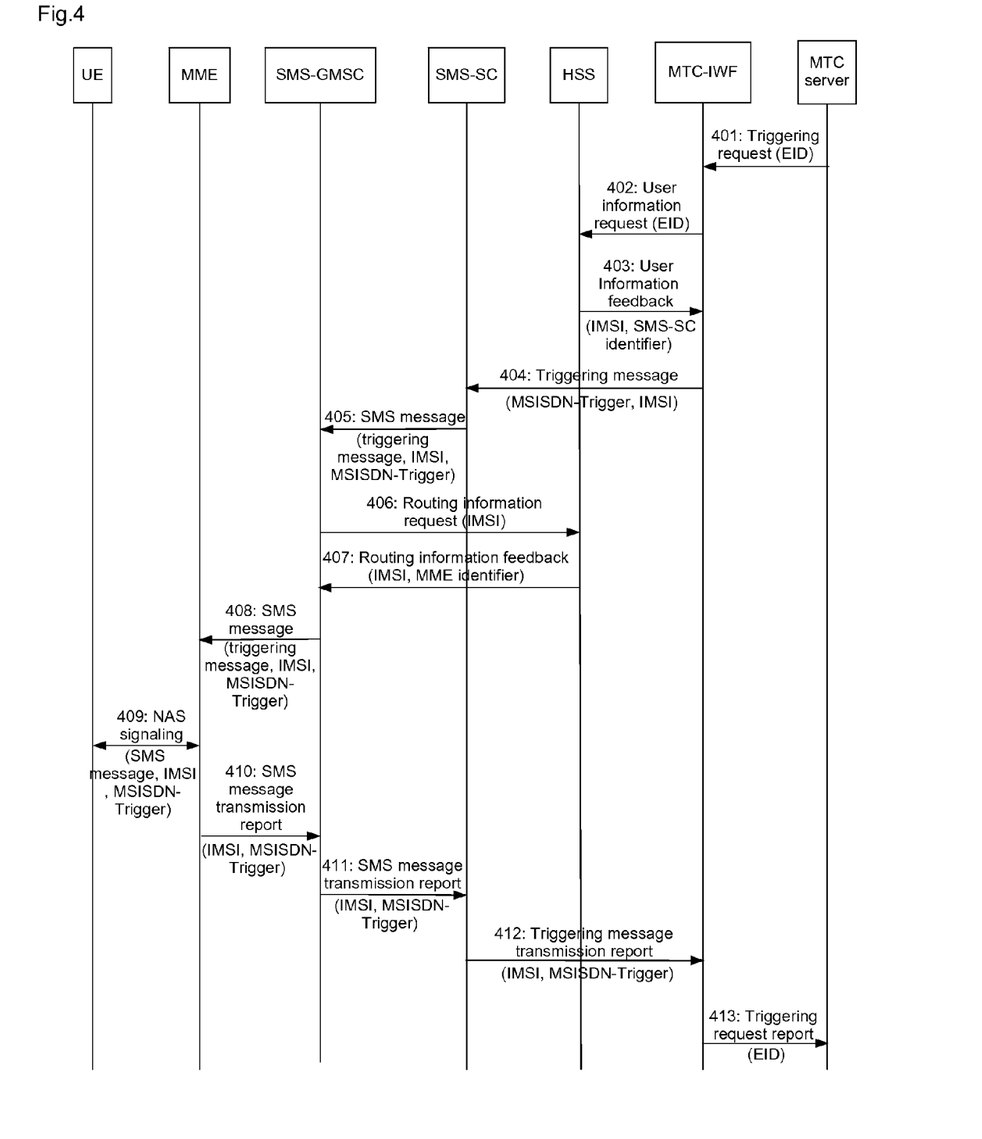
FIG. 4 is a flow chart of terminal triggering according to a second embodiment of the disclosure.

In a second embodiment of the disclosure, a TP-DA parameter in a TPDU of an SMS message is written as a triggering-specific identifier configured for a terminal at a network side device, a corresponding flow chart of terminal triggering is as shown in FIG. 4, which mainly includes the following steps:

steps 401 to 403 are as same as steps 301 to 303 described above, thus the detailed description thereof will be omitted.

Step 404, after acquiring and saving information of the terminal, the MTC-IWF configures a triggering-specific identifier for the terminal, and stores, an one-to-one mapping between the triggering-specific identifier and the EID, into the information of the terminal at the MTC-IWF.

In a specific embodiment, an identifier, e.g., MSISDN-Trigger, can be added to stored information at the MTC-IWF so as to indicate the triggering-specific identifier, said identifier has a format defined as same as that of a Mobile Subscriber ISDN (MSISDN) number of the terminal.

The MTC-IWF newly establishes a triggering message and transmits, to the serving SMS-SC of the terminal, the triggering message in which the MSISDN-Trigger and IMSI of the terminal are included.

Step 405, after receiving the triggering message from the MTC-IWF, the SMS-SC reads the MSISDN-Trigger and IMSI therein, establishes an SMS message carrying the triggering message, i.e., the triggering message serving as a information element of the SMS message, and transmits, to an SMS-GMSC, the SMS message carrying the triggering message, in which the IMSI of the terminal is included.

In addition, the SMS message contains a TPDU, in which a TP-DA parameter is written as the MSISDN-Trigger at the SMS-SC.

Step 406, after receiving the SMS message from the SMS-SC, the SMS-GMSC requests the HSS for routing information of the terminal via a routing information request message in which the IMSI of the terminal is included.

Step 407, after receiving the routing information request message from the SMS-GMSC, the HSS searches, according to the IMSI, a local database for an MME identifier indexed by the IMSI, then transmits to the SMS-GMSC a routing information feedback message in which the IMSI and the searched out MME identifier are included.

Step 408, after receiving the routing information feedback message, the SMS-GMSC reads the MME identifier therein, and transmits the SMS received from the SMS-SC to the MME corresponding to the MME identifier.

Step 409, the MME reads the IMSI in the SMS message, and queries, according to the IMSI, a local database for a state of the terminal; if the terminal is in an idle state, the MME transmits a paging message to the terminal which, after receiving the paging message, transmits to the MME a service request signaling requesting to establish a Non-Access Stratum (NAS) connection with the MME; after completion of the establishment of the NAS connection, the MME packages, the SMS message received from the SMS-GMSC, in an NAS signaling (downlink NAS transport signaling), i.e., the SMS message serving as an information element of the NAS signaling, and transmits the NAS signaling to the terminal. If the terminal is in a connection state, the MME directly packages the SMS message in the downlink NAS transport signaling and transmits the signaling to the terminal. After receiving the SMS message, the terminal transmits acknowledgement feedback information to the MME.

Step 410, the MME transmits, to the SMS-GMSC, an SMS message transmission report which indicates that the SMS message is successfully transmitted and which includes the IMSI and the MSISDN-Trigger written as the TP-DA parameter.

Step 411, after receiving the SMS message transmission report, the SMS-GMSC transmits, to the SMS-SC, the SMS message transmission report which indicates that the SMS message is successfully transmitted and which includes the IMSI of the terminal and the MSISDN-Trigger.

Step 412, after receiving the SMS message transmission report, the SMS-SC transmits, to the MTC-IWF, a triggering message transmission report which indicates that the triggering message is successfully transmitted and which includes the IMSI of the terminal and the MSISDN-Trigger.

Step 413, after receiving the triggering message transmission report, the MTC-IWF reads the IMSI and MSISDN-Trigger therein, searches, according to the IMSI, a local database for EIDs indexed by the IMSI, retrieves, in the searched out EIDs, the EID corresponding to the MSISDN-Trigger, and transmits, to the MTC server, a triggering request report which indicates that the triggering request is successful and which includes the EID corresponding to the MSISDN-Trigger.

Figure 5:
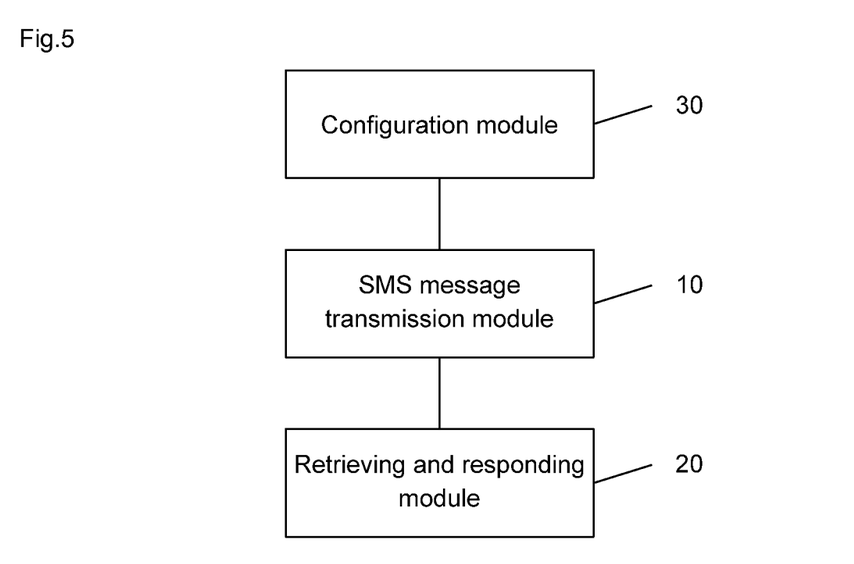
FIG. 5 is a schematic structural diagram of a network side device according to an embodiment of the disclosure.

Corresponding to the message processing method with respect to a terminal having multiple EIDs according to the embodiment of the disclosure, further disclosed is a network side device, as shown in FIG. 5, the device mainly includes an SMS message transmission module 10 and a retrieving and responding module 20.

In an embodiment, the SMS message transmission module 10 may be configured to transmit an SMS message carrying a triggering message to a terminal upon a triggering request from an MTC server, wherein the SMS message contains a TPDU, in which a TP-DA parameter is written as a LID of an EID or a triggering-specific identifier configured for the terminal; and the retrieving and responding module 20 may be configured to receive a triggering response from the terminal, retrieve the EID corresponding to the terminal according to the LID or triggering-specific identifier carried in the triggering response and respond to the triggering request from the MTC server according to the retrieved EID.

The SMS message carrying a triggering message may further contain an IMSI of the terminal, and the triggering response may further carry the IMSI of the terminal.

The retrieving and responding module 20 may be further configured to search, according to an IMSI carried in the triggering response, a local database in the network side device for EIDs indexed by the IMSI; and retrieve, in the searched out EIDs, the EID corresponding to the triggering-specific identifier carried in the triggering response.

The SMS message transmission module 10 may be further configured to store an one-to-one mapping between the triggering-specific identifier and the EID, when the TP-DA parameter is written as the triggering-specific identifier configured for the terminal at the network side device; and the retrieving and responding module 20 may be further configured to search, according to an IMSI carried in the triggering response, a local database in the network side device for EIDs indexed by the IMSI, and retrieve, in the searched out EIDs, the EID corresponding to the triggering-specific identifier carried in the triggering response.

As a preferred embodiment, the device may further include a configuration module 30 configured to add an identifier to stored information at the network side device as the triggering-specific identifier, which has a format as same as that of an MSISDN number of the terminal.

As an preferred embodiment of the disclosure, the SMS message transmission module 10 may be arranged within an SMS-SC, while the retrieving and responding module 20 and the configuration module 30 may be arranged within an MTC-IWF. However, the device is not limited to the embodiment described above, and it can be expanded as required.

To sum up, according to the embodiment of the disclosure, in a case of a terminal having multiple EIDs, when the terminal responds to an MTC server and requests to establish a connection with the MTC server, the network side can retrieve EIDs of the terminal and use a correct EID of the terminal to respond to a terminal triggering request from the MTC server; the TP-DA parameter is directly written as an LID or triggering-specific identifier of the terminal, this makes it possible to prevent excessive exposure of the authentic IMSI of the terminal to an network, thereby ensuring the security of the terminal.

What described are merely preferable embodiments of the disclosure, and are not intended to limit the disclosure.

INDUSTRIAL APPLICABILITY

By means of the disclosure, in a case of a terminal having multiple EIDs, when the terminal responds to an MTC server and requests to establish a connection with the MTC server, the network side can retrieve EIDs of the terminal and use a correct EID of the terminal to respond to a terminal triggering request from the MTC server; the TP-DA parameter is directly written as an LID or triggering-specific identifier of the terminal, this makes it possible to prevent excessive exposure of the authentic IMSI of the terminal to an network, thereby ensuring the security of the terminal.

The invention claimed is:

1. A message processing method with respect to a terminal having multiple External Identifiers (EIDs), the method comprising:
   transmitting, by a network side device, a Short Messaging Service (SMS) message carrying a triggering message to a terminal, upon a triggering request from a Machine Type Communication (MTC) server, wherein the SMS message contains a Transmission Protocol Data Unit (TPDU), in which a destination address (TP-DA) parameter is written as a Local Identifier (LID) of an EID or a triggering-specific identifier configured for the terminal;
   receiving, by the network side device, a triggering response from the terminal;
   retrieving the EID corresponding to the terminal according to the LID or triggering-specific identifier carried in the triggering response; and
   responding to the triggering request from the MTC server according to the retrieved EID; the method further comprising
   adding an identifier to stored information at the network side device as the triggering-specific identifier, which has a format as same as that of a Mobile Subscriber ISDN (MSISDN) number of the terminal.

2. The message processing method with respect to a terminal having multiple EIDs according to claim 1, wherein the retrieving the EID corresponding to the terminal according to the LID carried in the triggering response comprises:
   searching, according to an IMSI carried in the triggering response, a local database in the network side device for the EIDs indexed by the IMSI;
   and retrieving, in the searched out EIDs, the EID corresponding to the LID carried in the triggering response.

3. The message processing method with respect to a terminal having multiple EIDs according to claim 1, further comprising:
   storing an one-to-one mapping between the triggering-specific identifier and the EID, when the TP-DA parameter is written as the triggering-specific identifier configured for the terminal at the network side device;
   wherein the retrieving an EID corresponding to the terminal according to the triggering-specific identifier carried in the triggering response comprises:
   searching, according to an IMSI carried in the triggering response, a local database in the network side device for EIDs indexed by the IMSI; and
   retrieving, in the searched out EIDs, the EID corresponding to the triggering-specific identifier carried in the triggering response.

4. A network side device, comprising:
   a SMS Service Center (SMS-SC) configured to transmit an SMS message carrying a triggering message to a terminal upon a triggering request from a Machine Type Communication (MTC) server, wherein the SMS message contains a Transmission Protocol Data Unit (TPDU), in which a destination address (TP-DA) parameter is written as a Local Identifier (LID) of an EID or a triggering-specific identifier configured for the terminal; and
   a Machine Type Communication Inter Working Function (MTC-IWF) configured to receive a triggering response from the terminal, retrieve the EID corresponding to the terminal according to the LID or triggering-specific identifier carried in the triggering response and respond to the triggering request from the MTC server according to the retrieved EID;
   the MTC-IWF is further configured to add an identifier to stored information at the MTC-IWF as the triggering-specific identifier, which has a format as same as that of a Mobile Subscriber ISDN (MSISDN) number of the terminal.

5. The network side device according to claim 4, wherein the MTC-IWF is further configured to search, according to an IMSI carried in the triggering response, a local database in the network side device for the EIDs indexed by the IMSI, and retrieve, in the searched out EIDs, the EID corresponding to the LID carried in the triggering response.

6. The network side device according to claim 4, wherein the SMS-SC is further configured to store an one-to-one mapping between the triggering-specific identifier and the EID, when the TP-DA parameter is written as the triggering-specific identifier configured for the terminal at the network side device; and
   the MTC-IWF is configured to search, according to an IMSI carried in the triggering response, a local database in the network side device for EIDs indexed by the IMSI; and retrieve, in the searched out EIDs, the EID corresponding to the triggering-specific identifier carried in the triggering response.

* * * * *